United States Patent
Heneka et al.

(10) Patent No.: US 12,490,072 B1
(45) Date of Patent: Dec. 2, 2025

(54) SYSTEMS AND METHODS FOR AI-BASED REAL-TIME INCIDENT RESPONSE INTELLIGENCE

(71) Applicant: RAPIDSOS, INC., New York, NY (US)

(72) Inventors: Michael Anthony Heneka, Fabius, NY (US); Andrew Alfred Knitt, Oconomowoc, WI (US); David Paul Sehnert, Lafayette, CO (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 19/245,055

(22) Filed: Jun. 20, 2025

(51) Int. Cl.
*H04W 4/90* (2018.01)
*G06F 16/9537* (2019.01)
*G06F 40/279* (2020.01)

(52) U.S. Cl.
CPC .......... *H04W 4/90* (2018.02); *G06F 16/9537* (2019.01); *G06F 40/279* (2020.01)

(58) Field of Classification Search
CPC ..... G06F 40/279; G06F 16/9537; H04W 4/90
See application file for complete search history.

(56) References Cited

U.S. PATENT DOCUMENTS

| | | | |
|---|---|---|---|
| 10,115,283 B1 * | 10/2018 | Sokolov | G08B 21/0453 |
| 2006/0252998 A1 * | 11/2006 | Kimbrell | H04M 1/72418 |
| | | | 600/300 |
| 2011/0249008 A1 * | 10/2011 | Keene | G06T 17/05 |
| | | | 345/441 |
| 2014/0155018 A1 * | 6/2014 | Fan | H04W 72/51 |
| | | | 455/404.1 |
| 2021/0125494 A1 * | 4/2021 | Cho | G01S 3/8032 |

* cited by examiner

*Primary Examiner* — Dai Phuong

(74) *Attorney, Agent, or Firm* — Michael L. Ross; William J. Pigott

(57) ABSTRACT

An emergency response data system (ERDS) provides AI-based real-time intelligence during a response to an incident. The system includes a monitoring module configured to receive and process incident metadata from an emergency system, such as a Computer-Aided Dispatch (CAD) system, wherein the incident metadata includes location, type of emergency, units dispatched, and comments. An analysis module analyzes the incident metadata and identifies changes in incident circumstances, including comparing current comments with historical comments corresponding to the location. A data retrieval module accesses and retrieves public record information corresponding to the location, including property data, tax records, real estate records, historical records, and permits. An insight generation module generates real-time insights and updates regarding the incident, including reclassifying the type of emergency based on the analyzed metadata and retrieved public records. An alert module transmits the real-time insights to emergency personnel, including field responders and Emergency Communication Centers (ECC).

20 Claims, 8 Drawing Sheets

EXAMPLE INCIDENT NOTIFICATION 300

METHOD FOR ENHANCING INCIDENT RESPONSE BY PROVIDING REAL-TIME RESOURCE AWARENESS TO FIELD RESPONDERS 800

SYSTEMS AND METHODS FOR AI-BASED REAL-TIME INCIDENT RESPONSE INTELLIGENCE

TECHNICAL FIELD

The present disclosure relates generally to emergency management systems, and in particular to providing real-time intelligence to emergency personnel during incident response through the utilization of current and historical data pertaining to the incident. This proactive approach ensures that all necessary parties are informed and prepared to take appropriate action in dynamic situations, ultimately leading to a more coordinated and efficient emergency response. The systems and methods described herein provide updates to emergency personnel during incident response by monitoring metadata from a computer-aided dispatch (CAD) system and integrating additional information from public records and other sources.

BACKGROUND

Public safety relies on efficient incident response. However, traditional methods, which depend on static information and manual updates, can cause delays and misinterpretations, especially in evolving situations. This highlights the need for a system capable of providing real-time intelligence by dynamically analyzing data from multiple sources. Emergency response situations are often dynamic and can change rapidly. Current systems may not be able to provide real-time updates and intelligence to field responders and emergency communication centers (ECCs), potentially leading to inefficiencies, increased risk, and delayed or inappropriate responses.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
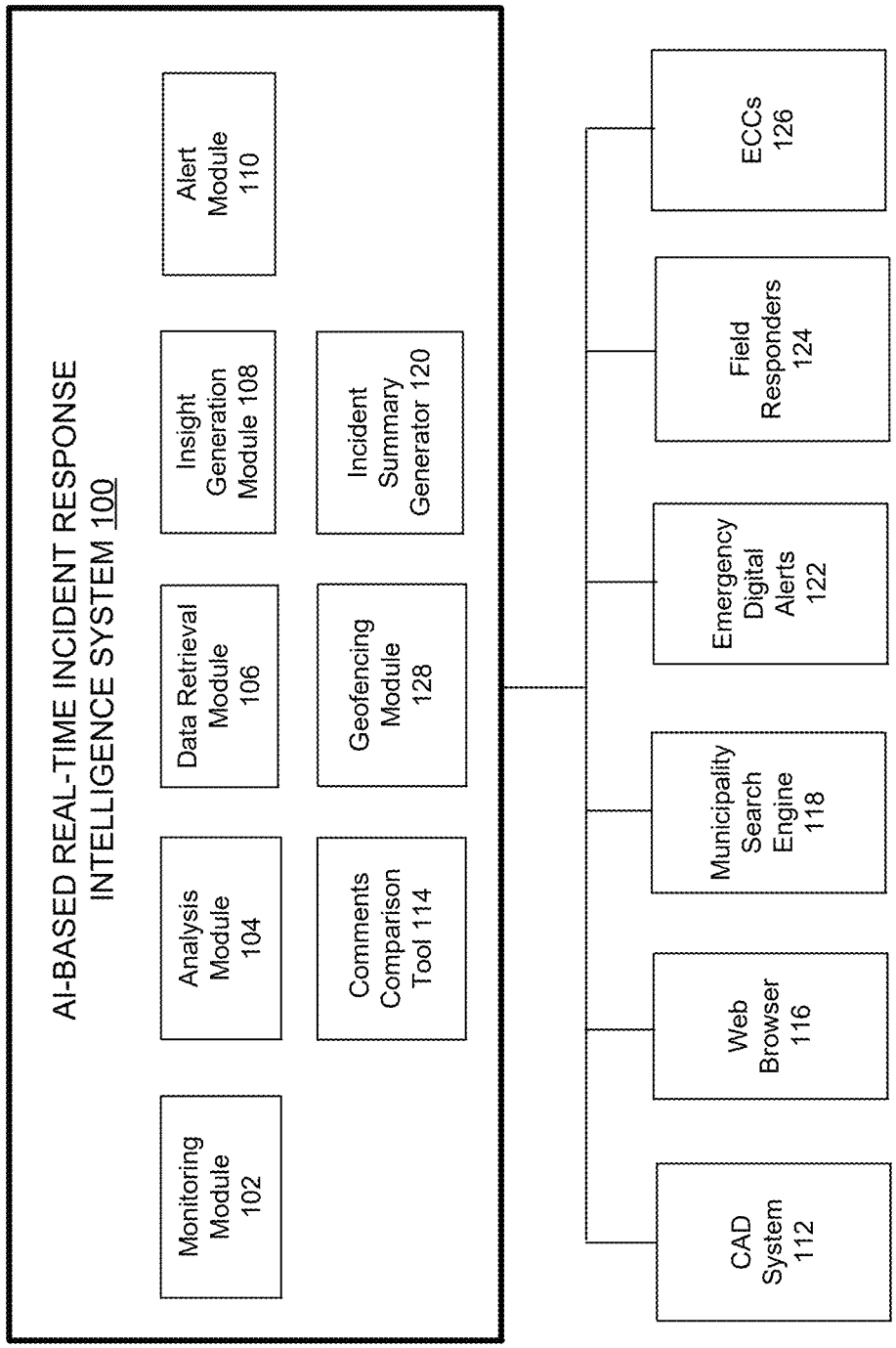
FIG. 1 illustrates an exemplary system diagram of an AI-based real-time incident response intelligence system, in accordance with embodiments of the disclosure.

Various aspects of the disclosure include systems, devices, media, algorithms, and methods for providing real-time intelligence and updates to emergency personnel, such as field responders and emergency communications centers (ECCs), using artificial intelligence (AI)-based analysis of computer-aided dispatch (CAD) system metadata and integration of public record information. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A public emergency services agency may be established to provide a variety of services. A public emergency services agency can include a 911 call center, a railway call center, a primary call center, a secondary call center (e.g., that receives calls from or routes calls to a primary call center), and the like. A public emergency services agency may be referred to as an ECC or an emergency service provider (ESP). One type of ESP or ECC is a public safety answering point (PSAP). A PSAP is another name for a 911 call center that receives emergency calls and dispatches emergency responders in response to the emergency (e.g., 911) calls.

As used herein, a first responder may refer to a firefighter, an emergency medical technician, a paramedic, a police officer, a peace officer, an emergency medical dispatcher, a search and rescue team member, a hazardous materials (HazMat) responder, volunteer emergency workers, and/or public health officials. The systems, processes, and overall technologies disclosed herein may be applicable or implemented for one or more of the various types of first responders, despite some specific examples being directed to firefighters and/or medical service providers for illustrative purposes.

As used herein, an emergency response request may refer to an initiated emergency communication (e.g., a 911 call, a textual message to 911, etc.), a radio-based dispatch of first responders, and/or a CAD-based dispatch of first responders. Furthermore, as used herein, operations centers refers to private operations centers that oversee, monitor, and/or manage security and emergency incidents across one or more related premises. Common types of operations centers (OC) that may, at least partially, coordinate response to security and emergency incidents include global security operations centers (GSOCs), railway network operations centers (NOCs), emergency operations centers (EOCs), cybersecurity operations centers (CSOCs), traffic operations centers (TOCs), energy or utility operations centers (UOCs), healthcare command centers, aviation operations centers, and maritime operations centers.

Accordingly, various embodiments of the disclosure enable keyword-based notifications by transcribing the radio dispatch audio. For example, a user could set up a keyword notification so that they may be sent a notification if a neighboring department's dispatch audio contains a specific word or collection of words, such as "structure fire," "house fire," "brush fire," etc. These keyword-based notifications allow users to have additional situational awareness about incidents occurring around them that they are likely to be dispatched to as mutual aid without having to be notified of every routine incident in neighboring jurisdictions. Overall, embodiments of the disclosure improve situational awareness for emergency response systems and first responders, and can lead to reduced response times and improved staffing levels for mutual aid requests, as the requested mutual aid agencies would have some advance notice that they may be requested and may start to plan accordingly.

The transcriptions noted above for voice dispatch information may have difficulties with unusual places, agency names, etc. However, proper transcription of place and agency names is critical for this type of feature to work reliably. Various embodiments of the disclosure note that including these place and agency names in the transcription prompt or in a subsequent "correction prompt" for AI may significantly improve the results. Additional embodiments may utilize AI structuring of the data to allow notifications to be sent to an agency informing them exactly which type of resource is being requested from them (an Engine, Ambulance, etc.). According to these embodiments, the audio dispatch may also be sent to agencies so that they can listen to it and determine for themselves what is being requested.

As noted above, public emergency services agencies, such as ESPs or ECCs, may use radio-based transmissions to dispatch (e.g., request emergency services to a location) first responders. These radio-based dispatches are sent very shortly after 911 calls are made and represent near real-time information about an emergency (e.g., location, time, type of emergency, severity, etc.). This incredibly valuable information can be masked by low-quality audio, ambiguous addresses, and/or jargon that is specific to emergency response. To address these issues and provide operations centers with up-to-date information about relevant emergencies, embodiments of the disclosure include systems and methods for providing artificial intelligence (AI)-based emergency notifications to operations centers using the radio-based dispatches.

According to one or more various embodiments of this disclosure, an emergency response data system (ERDS) performs a number of operations to generate AI-based emergency notifications. The ERDS may receive a dispatch audio data file from a detector (e.g., a radio wave receiver or transceiver) that converts dispatches into audio data and saves the audio data into audio files. The ERDS may extract metadata, such as, the source ECC for the dispatch, the (intended) destination first responder station, a time stamp, a location of the detector that received the radio dispatch. The ERDS may condition the audio data by removing background noise, tones, and silences, for example. The ERDS may determine a geographical bias or bias region associated with (e.g., that includes) the source ECC or destination first responder station. The ERDS may use the bias region to query a mapping service for potential street names within the bias region. The ERDS may use an AI model (or transcription service) to transcribe the audio data. The AI model may be trained with historical dispatch data (e.g., transcripts or computer-aided dispatch data). The transcript may be searched for names that may be part of an address or emergency location. One or more phonetical functions or analyses may be applied to the potential street names and/or searched names. Phonetical analysis may include encodings (Soundex, Metaphone, NYSIIS) and similarity metrics (e.g., Levenshtein distance, Jaro-Winkler, phonetic code comparison, etc.). Phonetical matches between the potential street names may be provided to an AI model as potential addresses to facilitate accurate location extraction.

The ERDS may apply the transcript of the radio dispatch to an AI model to generate various types of AI-based output. The AI-based output may include a location of the emergency, a transcript of the dispatch, a type of the emergency, and/or a summary of the dispatch. The ERDS may provide the bias region, the potential street names, the searched names, and/or the phonetical matches as context for prompt instructions "prompts" provided to the AI model. One or more detailed prompts may be provided to the AI model to generate content (e.g., AI-based output) for the AI-based emergency notifications. The ERDS may also offer translation of 911 call audio, providing additional valuable data for incident analysis. Accordinging, the AI model may incorporate both the ongoing radio communications and the transcribed/translated 911 call audio into its analysis, enhancing the real-time insights and providing a more comprehensive understanding of the situation as it evolves.

The AI-based output may be provided to an operations center emergency response application as part of an AI-based emergency notification. The emergency response application may display the location of the emergency as text, as a point on a map, and/or by highlighting a premises (e.g., building, structure, etc.). The ERDS may host the emergency response application and push updates to a remote instance of the application via an Internet-based connection with the instance.

FIG. 1 illustrates an exemplary system diagram of an AI-based real-time incident response intelligence system 100, in accordance with embodiments of the disclosure. The system 100 includes a monitoring module 102, an analysis module 104, a data retrieval module 106, an insight generation module 108, and an alert module 110.

The monitoring module 102 may be configured to receive and process incident metadata from a computer-aided dispatch (CAD) system 112, wherein the CAD metadata includes information such as location, type of emergency, units dispatched, and comments. Accordingly, the monitoring module 102 may acquire and interpret a variety of metadata crucial for situational awareness and operational efficiency. This CAD metadata may include a rich set of information originating from the initial emergency call and the subsequent dispatch activities. Key data points within this metadata stream include the precise geographical location of the reported incident, offering latitude and longitude coordinates or a street address to pinpoint the event. Furthermore, the metadata specifies the nature of the emergency, categorizing it as a fire, medical emergency, police matter, or other relevant incident types. The incident response intelligence system 100 also tracks which emergency response units, such as specific fire trucks, ambulances, or police vehicles, have been dispatched to the scene, including their unique identifiers and estimated times of arrival. Importantly, the CAD metadata often incorporates free-text comments entered by call-takers and dispatchers, providing additional context, real-time updates, and observations related to the ongoing situation. This comprehensive stream of information may then be processed by the monitoring module 102 to facilitate downstream functionalities, such as real-time mapping, resource allocation optimization, and post-incident analysis.

The analysis module 104 may be configured to analyze the incident metadata and identify changes in incident circumstances. This analysis includes comparing current comments with historical comments corresponding to the location using a comments comparison tool 114. One function of the analysis module 104 includes identifying alterations or shifts in the nature of an incident over time. To achieve this, the module is specifically configured to perform a comparative analysis of textual information. This analysis centers on the comments related to a particular location. The incident response intelligence system 100 maintains a record of historical comments associated with various locations. When a new or updated incident occurs at a previously recorded location, the analysis module leverages a dedicated comments comparison tool 114. This tool facilitates a detailed side-by-side examination of the current comments provided for the incident against the historical comments stored for that specific location. By scrutinizing the linguistic content, keywords, sentiment, and overall narrative presented in both sets of comments, the analysis module can effectively pinpoint changes in the reported circumstances of the incident. This capability enables a more nuanced and comprehensive understanding of how an event unfolds, potentially revealing critical information that might be missed by simply reviewing the latest data in isolation. The insights gained from this comparative analysis can be invaluable for situational awareness, resource allocation, and post-incident review processes.

The data retrieval module 106 may be configured to access and retrieve public record information corresponding to the location. This information can include property data, tax records, real estate records, historical records, and permits. For instance, the data retrieval module 106 may utilize a web browser 116 to access this information and a municipality search engine 118 to provide additional information on the location. The data retrieval module 106 may access diverse databases and online resources to gather pertinent details. The scope of information retrieved can encompass various categories, including detailed property data such as ownership history, property characteristics, and valuation assessments. Tax records, including property tax assessments, payment history, and any outstanding liens, are also accessed. Real estate records, such as deeds, mortgages, and other legal documents related to the property's transfer and encumbrances, are obtained. Furthermore, the module is designed to retrieve historical records associated with the location, which may include past ownership details, previous property uses, and historical permits. To ensure a thorough understanding of the location, the data retrieval module 106 also gathers information on existing permits, such as building permits, zoning permits, and environmental permits, providing insights into the legal and regulatory status of the property. To facilitate this information retrieval process, the data retrieval module 106 is equipped with the capability to utilize a web browser 116. This allows the module to interact with various online databases and websites that host public record information. In addition to direct database access, the module can leverage a dedicated municipality search engine 118. This specialized search engine is designed to aggregate and index information specific to municipalities, enabling the data retrieval module 106 to efficiently locate and retrieve additional relevant information that might not be readily available through standard public record databases. The integration of both a web browser 116 and a municipality search engine 118 enhances the module's ability to provide a comprehensive and up-to-date picture of the location based on publicly available information.

The insight generation module 108 may be configured to generate real-time insights and updates regarding the incident. This includes reclassifying the type of emergency based on the analyzed metadata and retrieved public records, and generating incident summaries using an incident summary generator 120. The insight generation module 108 may also access emergency digital alerts 122, such as Hazmat summaries and handling instructions. The insight generation module 108 plays a crucial role in providing timely and relevant information throughout the lifecycle of an incident. Its primary function is to dynamically analyze incoming metadata and correlate it with publicly available records to generate real-time insights and updates. This capability allows for a continuous refinement of the incident classification, ensuring that the emergency type accurately reflects the evolving situation. For instance, initial reports might suggest a fire, but as the module analyzes data from sensors, witness accounts, and official databases, it could reclassify the event as a hazardous material incident, triggering specific protocols and alerts.

The incident summary generator 120 may automatically create concise and up-to-date summaries of the incident, drawing upon the analyzed data and generated insights. These summaries can include critical details such as the incident location, confirmed emergency type, involved parties, current status, and potential impacts. The incident summaries are intended to provide stakeholders with a quick and comprehensive understanding of the situation without requiring them to sift through raw data.

Furthermore, the insight generation module 108 may be designed to seamlessly integrate and access emergency digital alerts 122. This feature enables the incident response intelligence system 100 to retrieve and disseminate vital information such as Hazmat summaries, including detailed chemical properties, potential hazards, and safe handling instructions. Access to these readily available digital alerts can significantly enhance situational awareness for first responders and other involved personnel, enabling them to make informed decisions and take appropriate actions to mitigate risks and ensure safety. The module's ability to proactively retrieve and present such critical information underscores its importance in facilitating an effective and coordinated response to emergency situations.

The alert module 110 may be configured to transmit the real-time insights to emergency personnel, including field responders 124 and emergency communication centers (ECC) 126. This includes not only the initial dispatch information but also access to ongoing radio communications and updates throughout the course of the incident. The alert module 110 may also be configured to notify field responders of nearby cameras and other investigative resources. Thus, the alert module 110 disseminates real-time insights derived from the incident response intelligence system 100 to relevant emergency personnel. This includes not only field responders 124, who are actively engaged at the scene of an incident, but also personnel stationed at emergency communication centers (ECC) 126, who are responsible for coordinating resources and managing the overall emergency response. The transmission of these insights may encompass a wide range of critical information, such as the nature and severity of the emergency, the precise location of the incident, and any other contextual data that could enhance situational awareness and facilitate a more effective and timely response.

Furthermore, the alert module 110 possesses the capability to provide field responders with supplementary information that could aid their investigative efforts. This includes the ability to notify them of the presence and location of nearby cameras, which could potentially offer valuable visual evidence or perspectives on the unfolding situation. The incident response intelligence system 100 may also identify and alert responders to the availability of other investigative resources in the vicinity, such as relevant databases, sensor networks, or even specialized equipment that could prove beneficial in understanding the incident and formulating an appropriate course of action.

For instance, relevant databases may include, but are not limited to, databases containing information relevant to the location or incident, such as: criminal history databases to check for prior incidents or individuals with criminal records associated with the address (e.g., building code violations, weapons charges, domestic violence, substance abuse, family custody issues, etc.); motor vehicle records, to identify vehicle ownership, registration details, and accident history associated with individuals or vehicles at the location; building permit databases to view structural plans, construction details, or safety features of the property; hazardous materials databases to identify potentially hazardous substances stored or used at the location; etc. Furthermore, sensor networks may include, but are not limited to, environmental sensors, alarm systems, or other devices that provide real-time data about conditions at the incident location, such as: smoke detectors or fire alarm systems to provide early warning or confirmation of a fire; motion sensors or security systems to indicate potential intrusion or activity at the scene; weather stations to supply information about local weather conditions that might affect the response; etc. Furthermore, specialized equipment may involve alerting responders to the availability of specialized tools or equipment in the area, such as, but not limited to, thermal imaging cameras to detect heat signatures and locate individuals inside a building; hazmat detection equipment to identify and analyze hazardous materials; drones or unmanned aerial vehicles (UAVs) to provide aerial surveillance or to assess damage; as well as other agencies or personnel, such as, but not limited to: utility companies to shut off gas or electricity in case of a hazard; specialized rescue teams (e.g., technical rescue, water rescue teams, etc.); animal control, etc.

By proactively providing field responders with awareness of these nearby resources, the alert module 110 aims to empower them with enhanced information and tools to effectively address the emergency at hand. According to an additional embodiment, the alert module 110 may further incorporate geofencing capabilities. The system may define one or more geographical boundaries or "geofences" around incident locations. A geofence may refer to a virtual geographic boundary, defined by location-based technology (e.g., Global Positioning System (GPS), Radio-Frequency Identification (RFID), etc.) that enables software to trigger a response when a mobile device enters or leaves a particular area. Accordingly, when a field responder, such as one from a mutual aid agency, enters a designated geofenced area, the alert module 110 may automatically trigger a push notification to their device via the emergency response application 406. This push notification may include a concise incident summary generated by the insight generation module 108, leveraging data from the analyzed incident metadata and retrieved public records. The incident summary may specifically focus on critical information relevant to incoming mutual aid personnel, such as, but not limited to, the severity of the incident (as potentially reclassified by the insight generation module 108), the location of incident command, shelter information, evacuation route details, specific requests for resources or expertise, etc. This proactive delivery of information ensures that field responders from outside agencies have immediate situational awareness upon arrival, facilitating seamless interoperability and efficient support.

To further enhance the situational awareness of field responders, a geofencing module 128 has been incorporated into the system, as depicted in FIG. 1. This module is configured to define virtual geographic boundaries, or 'geofences,' around the location of an emergency incident. These geofences can be dynamically created based on the incident's determined location and can be customized in size and shape as needed. When a field responder's device enters a defined geofenced area, the geofencing module 128 triggers an alert via the alert module 110. This alert may deliver specific incident-related information, such as the updated incident summary, potential hazards, and the location of nearby resources. By doing so, the geofencing module 128 ensures that responders arriving at the scene, especially those from mutual aid agencies, receive timely and pertinent information, thereby improving response coordination and effectiveness.

It is further noted that accessible records described herein may also include: utility records to identify active utility connections (e.g., gas, electricity, water), historical consumption data, or any reported issues (e.g., gas leaks, power outages) at the location; non-criminal court records to identify civil litigation, liens, property disputes, or bankruptcy filings associated with the property or individuals; business licenses and permits to determine the type of business operating at a commercial location, its operational history, and any regulatory compliance information; environmental violation records to check for past or present environmental hazards, spills, or non-compliance issues related to the property; zoning and land use records to confirm the legal uses of a property, future development plans, or any variances granted; public health records to identify any known health hazards, infectious disease outbreaks, or public health advisories related to the location; fire department incident reports to access detailed reports of previous fires or emergency incidents at the location, including cause, damage, and response details; EMS run reports to identify prior medical emergencies at the location, types of calls; school district records, if the incident involves a school, to access information about school layout, emergency plans, or student information; census data to understand the general population characteristics of the area that may be relevant for resource allocation or community impact assessment; etc.

Figure 2:
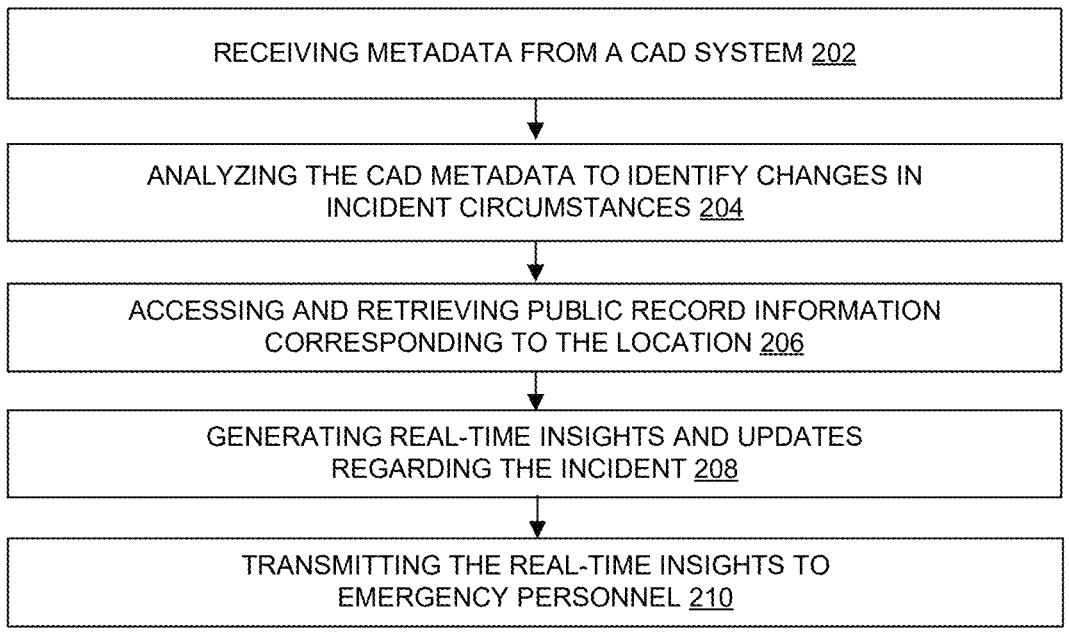
FIG. 2 illustrates an exemplary flow diagram of a process for providing AI-based real-time incident response intelligence, in accordance with embodiments of the disclosure.

FIG. 2 illustrates an exemplary flow diagram of a process 200 for providing AI-based real-time incident response intelligence, in accordance with embodiments of the disclosure. The order in which some or all of the process operation blocks appear in process 200 should not be deemed limiting. Rather, one of ordinary skill in the art having the benefit of the present disclosure will understand that some of the process blocks may be executed in a variety of orders not illustrated, or even in parallel. The operations of process 200 may be performed by a particular system (e.g., incident response intelligence system 100 of FIG. 1) or may be distributed between various subsystems or modules in an ERDS, according to various embodiments. The operation of process 200 may be performed iteratively.

At operation 202 within process 200, the incident response intelligence system 100 interfaces with an emergency system, such as a computer-aided dispatch (CAD) system, to acquire crucial incident metadata pertaining to ongoing emergencies. According to a further embodiment, the incident metadata may be acquired from alternative data sources, such as transcription and/or translation modules and services capable of accessing and processing ongoing radio communications throughout the course of the incident.

Regardless of the data source, the incoming incident metadata stream encompasses several key data points vital for effective emergency response. Firstly, the location of the incident is received, providing the necessary geographical context for dispatching appropriate resources. Secondly, the type of emergency is identified, categorizing the nature of the situation, such as medical emergency, fire, or police incident, thereby enabling the incident response intelligence system 100 to prioritize and allocate specialized units. The metadata also includes details about the specific emergency response units that have been dispatched to the scene, allowing for tracking and coordination of deployed personnel and vehicles. Furthermore, any relevant comments or notes entered at the emergency system (e.g., by the CAD operator) are also received, potentially offering additional context or specific instructions for responding units.

Expanding on the data acquisition process, operation 202 may also involve receiving real-time communication data directly from emergency responders. This could occur following an initiated emergency communication originating from one or more emergency communications centers (ECCs), as described in one embodiment of the incident response intelligence system 100. This direct communication channel provides a supplementary source of information, potentially including live updates from the scene, requests for additional resources, or changes in the situation that may not be immediately reflected in the emergency incident metadata. The integration of both incident metadata and direct responder communication allows the incident response intelligence system 100 to build a comprehensive and dynamic understanding of the unfolding emergency event.

At operation 204, the process 200 analyzes the incident metadata to identify changes in incident circumstances, including comparing current comments with historical comments corresponding to the location. This analysis is specifically focused on detecting alterations or modifications that signify changes in the circumstances surrounding an incident. A key aspect of this analysis involves a thorough comparison of the comments currently associated with the incident location against the historical record of comments that have pertained to the same location in previous incidents. This comparison allows the incident response intelligence system 100 to identify both new developments and recurring patterns in incident details. By examining the evolution of comments over time, the process aims to gain a deeper understanding of the incident context and potentially uncover crucial information that might not be immediately apparent from the current data alone. This historical comparison can reveal trends, pre-existing conditions, or recurring issues at a specific location, thereby enhancing the overall situational awareness and the effectiveness of the response. The identified changes in incident circumstances, gleaned from both the current and historical comments within the incident metadata, are then utilized in subsequent operations of the process 200 to inform decision-making and guide appropriate actions.

At operation 206, process 200 accesses and retrieves public record information corresponding to the location, including property data, tax records, real estate records, historical records, and permits. This comprehensive data acquisition phase encompasses a variety of essential details, beginning with property data, which may include information such as property size, boundaries, zoning regulations, and structural characteristics. Furthermore, the incident response intelligence system 100 retrieves tax records associated with the location, providing insights into property valuation, tax assessments, and payment history. Real estate records are also accessed to gather information related to ownership history, past transactions, liens, and encumbrances. To provide a deeper understanding of the location's background, historical records, such as previous ownership details, significant events that occurred at the location, and historical land use information, are also collected. Finally, the process includes the retrieval of relevant permits that have been issued for the location, which could include building permits, environmental permits, and other authorizations that govern activities or structures at the property. The aggregation of this diverse set of public record information aims to create a comprehensive profile of the location, enabling subsequent processes to leverage this rich dataset for various analytical or operational purposes.

At operation 208, the process 200 generates real-time insights and updates regarding the incident, including reclassifying the type of emergency based on the analyzed metadata and retrieved public records. In other words, the incident response intelligence system 100 may generate real-time insights and updates to maintain situational awareness throughout the emergency response lifecycle. This includes dynamically reclassifying the nature of the emergency. This reclassification is achieved through continuous analysis of incoming metadata associated with the incident, such as location data, caller information, and initial reports. Simultaneously, the incident response intelligence system 100 retrieves and analyzes relevant public records, potentially including historical incident data, geographical information system (GIS) layers, and building schematics. By correlating the analyzed metadata with the information extracted from public records, the incident response intelligence system 100 can refine the initial classification of the emergency, providing more accurate information to first responders and relevant stakeholders. This dynamic reclassification ensures that the response strategy remains appropriate as new information becomes available, optimizing resource allocation and improving overall incident management effectiveness.

At operation 210 of process 200 transmits the real-time insights to emergency personnel, including field responders and emergency communication centers (ECC). Accordingly, real-time insights and critical information gleaned from the preceding operations may be directly to relevant emergency personnel. This comprehensive data dissemination includes both field responders who are en route to or present at the scene of an emergency, and personnel staffing emergency communication centers (ECCs) responsible for coordinating the overall response. The transmitted real-time insights may encompass a wide range of data points, such as the precise location of the emergency, the nature and severity of the incident as it unfolds, environmental conditions that could impact safety or response efforts, and any other pertinent information that can enhance situational awareness and decision-making for those involved in managing the emergency. This immediate and accurate flow of information is crucial for enabling faster, more effective response strategies, ultimately contributing to improved outcomes in emergency situations.

According to an additional embodiment, the transmission may be triggered by a field responder entering a defined geofenced area surrounding the incident, wherein a push notification containing an AI-generated incident summary is delivered to the responder's device via the emergency response application 406.

Figure 3:
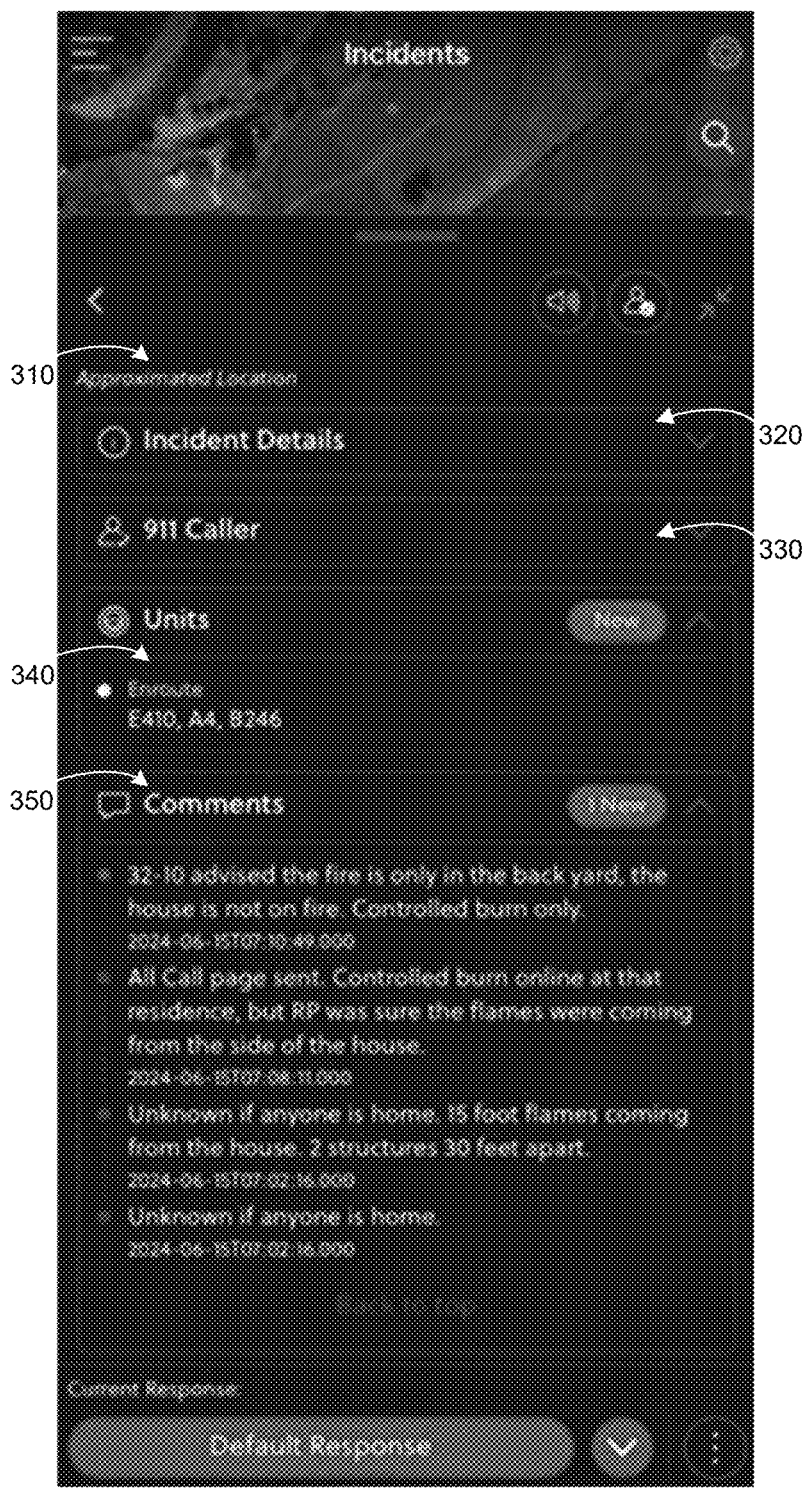
FIG. 3 illustrates an exemplary incident notification display, according to an embodiment.

FIG. 3 illustrates an exemplary incident notification display 300, according to an embodiment. The display provides a user interface for presenting real-time information and updates related to an incident. The data included within the incident notification display 300 may be provided by the alert module 110 based on information from the insight generation module 108 and the incident summary generator 120 from FIG. 1. The incident notification display 300 may feature several key sections, such as, but not limited to, those sections detailed below.

The exemplary incident notification display 300 includes an Approximated Location section 310 which indicates the geographical location of the incident on a map as well as an address (not shown). The incident notification display 300 further includes an Incident Details section 320 to provide specific information about the incident, as well as a 911 Caller section 330 indicating information related to the 911 caller. The incident notification display 300 further includes a Units Enroute section 340 listing the emergency response units dispatched to the scene (e.g., "E410, A4, B246").

Furthermore, the exemplary incident notification display 300 features a Comments section 350 as well as an indication of the number of new comments or updates related to the incident (e.g., "1 New"). The Comments section 350 displays a chronological log of comments and updates related to the incident. Each comment includes the content of the comment and a timestamp indicating when the comment was recorded. For example, the comments show a progression of information:

An initial comment at "2024-06-15T07:02:16.000" indicates "Unknown if anyone is home. 15 foot flames coming from the house. 2 structures 30 feet apart." A subsequent comment at "2024-06-15T07:08:11.000" states "All Call page sent." Controlled burn online at that residence, but RP was sure the flames were coming from the side of the house." A later comment at "2024-06-15T07:10:49.000" clarifies that "32-10 advised the fire is only in the back yard, the house is not on fire. Controlled burn only."

Figure 4:
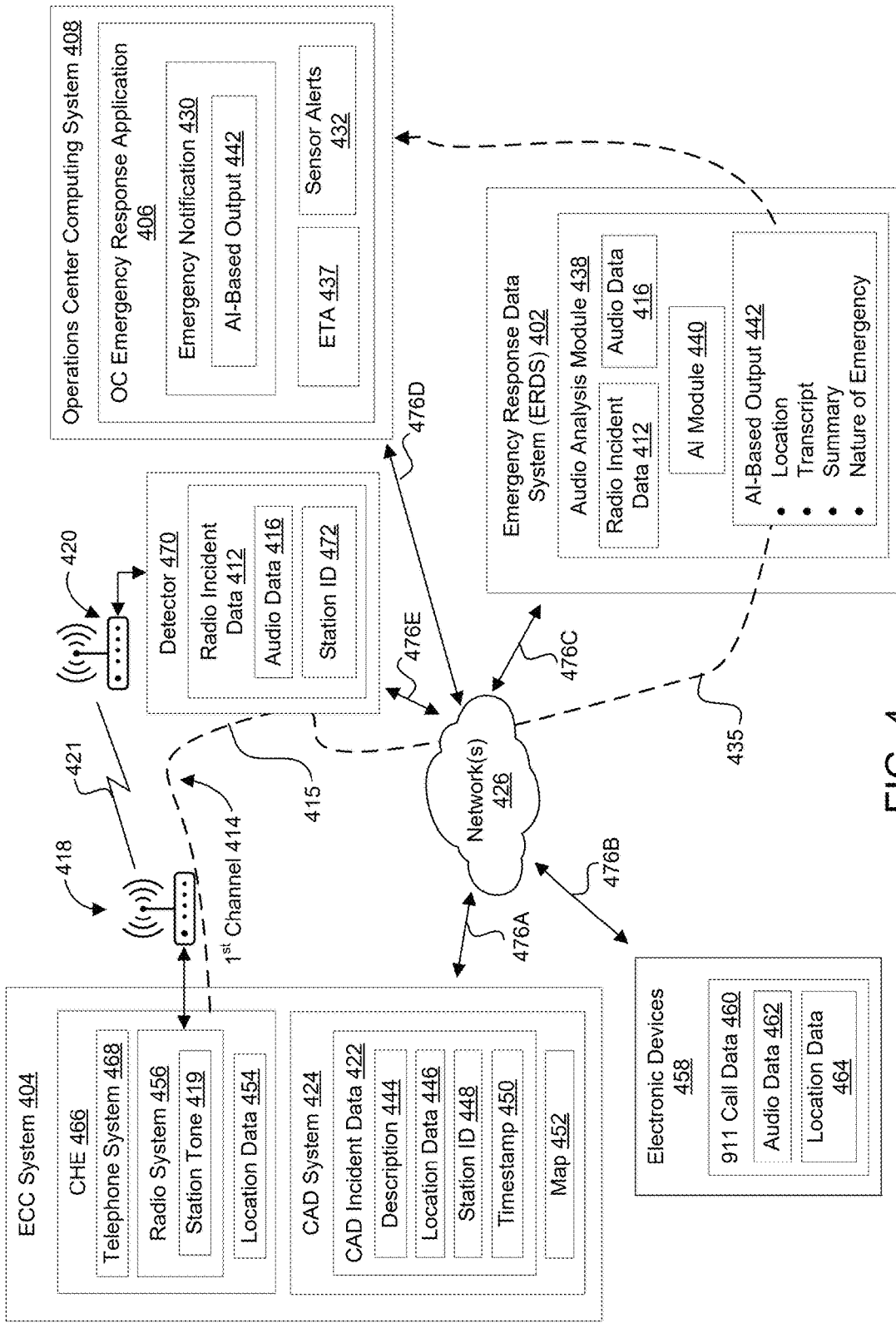
FIG. 4 illustrates an example system diagram of an emergency notification environment that provides artificial intelligence (AI)-based emergency notifications to field responders using radio-based dispatches, in accordance with aspects of the disclosure.

Accordingly, exemplary incident notification display 300 provides a consolidated view of critical incident information, including unit dispatch details and a timeline of comments, facilitating real-time situational awareness for emergency responders FIG. 4 illustrates an example system diagram of an emergency notification environment 400 that provides AI-based emergency notifications to field responders using radio-based dispatches, in accordance with aspects of the disclosure. As noted above, this may include not only the initial dispatch information but also access to ongoing radio communications and updates throughout the course of the incident. Emergency notification environment 400 includes an emergency response data system (ERDS) 402 (representing the incident response intelligence system 100 of FIG. 1) that is operable to receive emergency response requests (e.g., a dispatch) over one or more channels from an ECC system 404 and is operable to provide an AI-based analysis of radio-based requests/dispatches to generate and provide notification of an emergency at one or more premises managed by an operations center, in accordance with aspects of the disclosure. One channel may be at least partially based on an over-the-air radio transmission (e.g., in the VHF or UHF bands) from a dispatcher, and another of channel may at least partially be from an emergency system, such as a computer-aided dispatch (CAD) system 424. Because operations centers (e.g., a GSOC, train NOC, etc.) may be unaware of emergency calls (e.g., calls to 911), operations centers may be unable to provide resources (e.g., onsite security, onsite medical, etc.) to the location of an emergency call. Additionally, first responders may need access to buildings, gates, or other access points that could be opened prior to the arrival of the first responders, had an operations center known of the time, place, and/or nature of emergency calls made from the premises managed by the operations center. Various embodiments of the disclosure enable AI-based emergency notifications using radio-based dispatches that can be monitored over-the-air and analyzed.

ERDS 402 receives and analyzes emergency response requests (e.g., radio-based dispatches) to support generating an emergency notification 430 for operations center computing system (OCCS) 408, in accordance with aspects of the disclosure. ERDS 402 is configured to receive radio incident data 412 over a first channel 414. First channel 414 may have a path 415 that extends from ECC system 404 to detector 470, to ERDS 402, and to OCCS 408. First channel 414 at least partially includes radio transmission of audio data 416 from a radio 418 to a radio 420. Radio 418 may be a UHF and/or VHF radio transceiver that is operated by a dispatcher or telecommunicator at an ECC. Radio 420 may be a radio receiver or scanner that is configured to receive audio transmissions from radio 418 over one or more frequencies. Radio incident data 412 includes an over-the-air emergency response request that may initially be an audio recording of a dispatched incident (e.g., represented as audio data 416). Radio incident data 412 may also include a time stamp and a station ID 417 that identifies the one or more dispatched stations (e.g., fire station, emergency medical services, etc.). The station ID 417 may be determined based on a station tone 419 used during the radio communications that provide the emergency response request. ERDS 402 may analyze/compare radio incident data 412 and CAD incident data 422 to determine if one source of incident data is duplicative of the other and/or to perform error correction. ERDS 402 analyzes content of audio data 416 and provides AI-based output 442 to operations center (OC) emergency response application 406, in accordance with aspects of the disclosure.

ERDS 402 may include an audio analysis module 438 (a component of monitoring module 102 and/or analysis module 104) to provide emergency notification 430 to OC emergency response application 406, according to an embodiment. Audio analysis module 438 may generate emergency notification 430 based on audio processing, transcribing, translating, AI analyzing, and/or formatting audio data 416, according to an embodiment. Audio analysis module 438 may generate emergency notification 430 without transcribing audio data 416 and instead may apply audio data 416 directly to one or more AI models (e.g., AI module 440, a component within the insight generation module 108) to generate at least parts of emergency notification 430. Audio analysis module 438 may be configured to extract audio data 416 from radio incident data 412 and apply audio data 416 to an AI module 440 to generate AI-based output 442 (representing an output of the insight generation module 108 and transmitted by the alert module 110), according to an embodiment. AI module 440 may include one or more of: a transcription tool, a transcription service, a translation tool, a language translation service, a large language model (LLM), one or more machine learning algorithms, and/or an AI model, in accordance with various aspects of the disclosure. Audio analysis module 438 may provide audio data 416 and one or more prompts to AI module 440 (e.g., one or more AI models) to generate AI-based output 442, according to an embodiment.

AI module 440 may be implemented using one or more of a variety of technologies. AI module 440 may be a service that ERDS 402 communicates with remotely or may include a number of libraries and software packages installed onto one or more local or distributed server (e.g., cloud) systems. AI module 440 may be implemented using transfer learning models that apply knowledge learned from one task to another, typically using pre-trained models. Examples of transfer learning models that may be used include, but are not limited to, BERT (bidirectional encoder representations from transformers): a transformer-based model for natural language processing tasks; GPT (generative pre-trained transformer): a generative model for text-based tasks; and ResNet: a pre-trained deep learning model commonly used for image classification. AI module 440 may incorporate other types of models, such as deep learning models, unsupervised models, generative models, recommender systems, or the like. Examples of deep learning models may include convolutional neural networks (CNN), which may be used for image recognition tasks; recurrent neural networks (RNN), which may be used for sequential data, such as time series or natural language; and long short-term memory networks (LSTMN), for example.

AI module 440 may be implemented using one or more LLMs, according to an embodiment. LLMs are AI models that are trained to understand and generate human language. LLMs use large amounts of text data to learn patterns, context, and meaning in language. Examples of LLMs include, but are not limited to, generative pre-trained transformers (GPTs), BERT, DistilBERT, T5 (Text-to-Text Transfer Transformer), XLNet, Turing-NLG, LLaMA (Large Language Model Meta AI), Claude, PaLM (Pathways Language Model), Megatron-Turing NLG, ChatGPT, OpenAI Codex, ERNIE (Enhanced Representation through Knowledge Integration), and/or Grok.

In some embodiments, the described systems and methods may utilize a tiered approach to AI and machine learning (ML) to provide real-time incident response intelligence. This approach leverages a combination of different AI and machine learning models, each optimized for specific tasks within the incident lifecycle. For instance, a natural language processing (NLP) model may be employed to analyze transcribed voice data from radio dispatches or 911 calls, extracting key information such as locations, incident types, and relevant entities. A classification model may then be used to determine or reclassify the precise nature of the incident based on the analyzed data. Furthermore, a summarization model can generate concise and readable reports for emergency personnel, providing immediate situational awareness.

In some embodiments, the system may implement a tiered model stack, wherein lightweight models are deployed to execute real-time triage and flag potential issues efficiently. These lightweight models can quickly process large volumes of data to identify initial indicators of an emergency or significant changes in an ongoing incident. Concurrently or subsequently, larger foundation models, such as LLMs, may be utilized to generate more comprehensive narrative updates or conduct deeper semantic interpretation of multi-source data. This allows for a more nuanced understanding of complex situations and the generation of richer insights. The overarching goal is to trigger numerous optimized AI models throughout the incident lifecycle, ensuring that the most appropriate AI/ML capabilities are applied at each stage. For example, automatic speech recognition (ASR), NLP, and LLM capabilities might all be triggered for a single incident to provide a holistic analysis. Additionally, an LLM may be tasked with checking nearby incidents and sharing insights to enhance overall situational awareness and coordination across different emergency events.

ERDS 402 is configured to receive CAD incident data 422 from a CAD system 424 over one or more networks 426, according to an embodiment. CAD incident data 422 includes, but is not limited to, a description 444, location data 446, a station ID 448, and a timestamp 450, according to embodiments of the disclosure. Location data 446 and/or other CAD incident data 422 may be displayed or otherwise represented on a map 452 of CAD system 424.

ERDS 402 may be configured to receive CAD incident data 422 over a second channel 434. The second channel 434 is a CAD-based transmission/reception of an emergency request response, according to an embodiment. ERDS 402 may support a number of application programming interfaces (APIs) that enable CAD system 424 to transmit/receive incident data for emergency response requests. The second channel 434 includes a data path 435 that extends from CAD system 424, extends to ERDS 402 through one or more networks 426, and extends to emergency response application 406, according to an embodiment. CAD incident data 422 includes an emergency response request (e.g., inclusive of description 444, location data 446, and/or station ID 448) that may initially become available from CAD system 424 and be dispatched electronically to, for example, ERDS 402. ERDS 402 may evaluate radio incident data 412 and CAD incident data 422 and selectively train one or more AI models for accuracy improvement.

Emergency response requests may be initiated with electronic devices, according to an embodiment. Electronic devices 458 represent smart phones, smart watches, tablets, laptops, computer systems, or the like. Electronic devices 458 may initiate an emergency response request with various types of emergency communication, such as a 911 call, a textual message to 911, a panic button, or the like. Electronic devices 458 may then provide 911 call data 460 to ECC system 404 using one or more cellular networks or other networks 426. The 911 call data 460 may include audio data 462 and location data 464. The audio data 462 is representative of the information a caller audibly (or text-based) provides to ECC system 404 during, for example, a conversation with a telecommunicator, in one embodiment. The location data 464 may represent device-based location data (e.g., GPS, other satellite network, wireless router location, etc.) or may represent automated location information (ALI) data that is at least partially generated/provided by a cellular tower as an estimated location of an electronic device.

ECC system 404 provides tools for call-takers, dispatchers, or other telecommunicators to interact with emergency number callers (e.g., users of electronic devices 458). ECC system 404 may include call handling equipment (CHE) 466 and CAD system 424 to support delivery of emergency response requests to first responder devices and/or to OCCS 408. CHE 466 may include a telephone system 468 and radio system 456 (inclusive of radio 418) for receiving 911 call data 460 and for communicating radio incident data 412, and location data 454, according to an embodiment. Telephone system 468 may include one or more landlines and one or more voice over IP (VOIP) lines. A telecommunicator may use radio system 456 to broadcast an over-the-air emergency response request to one or more emergency responders 410. As part of dispatching an over-the-air emergency response request, radio system 456 may emit a station tone 419 and audio data 416 with radio 418 over ultra-high frequency (UHF) and/or very-high frequency (VHF) bandwidths. Station tones can be associated with one or more particular stations or types of emergency responders 410 (e.g., firefighter, emergency medical services, police officers, etc.). For example, within a county a first fire station may be assigned or associated with a first tone sequence, a second fire station may be assigned or associated with a second tone sequence, and all fire stations within the county may be assigned/associated with a third tone sequence. In the same county, a first emergency medical service (e.g., emergency medical technicians (EMTs)) station may be assigned a fourth tone, a second emergency medical service station may be assigned a fifth tone sequence, and the first fire station and the second emergency service station may be assigned a sixth tone sequence, for example. In some counties, a fire station may also serve as an emergency medical service station, so the station may be associated with a single tone sequence or three separate tone sequences, for example.

CAD system 424 may be used in parallel with CHE 466 by telecommunicators to provide emergency response requests to emergency responders 410. CAD system 424 may automatically receive at least part of CAD incident data 422 (e.g., location data 446) from EMS 402 or other emergency data providers, according to one embodiment. CAD system 424 may also receive CAD incident data 422 by a dispatcher or telecommunicator that enters the content of audio data 462 into CAD system 424. CAD incident data 422 includes description 444, location data 446, station ID 448, and timestamp 450. Description 444 may include the type of incident, people involved in the incident, a description of injuries, and the like. Location data 446 may include an address, descriptive location, and/or latitude/longitude coordinates to an incident. The term "address" may be used interchangeably with "descriptive location". An address or descriptive location may include a street address, a general location, and/or a street address combined with a description or address modifier, such as: in front of 123 Main Street, across the street from 234 Second Street, southwest of the residence on 345 Third Street, on the north end of Bay View Park, etc. Station ID 448 may include an identifier of one or more fire stations or emergency medical services stations that are near the location of an incident or that have jurisdictional responsibility for the location of the incident. The timestamp 450 may provide a date and time for when a call was made to 911 or may refer to when CAD incident data 422 was entered into CAD system 424.

Emergency notification environment 400 may include detector 470 that is operable to digitally capture information provided by radio 418 and received by radio 420, according to an embodiment. Detector 470 may be communicatively coupled to radio 420, and radio 420 may be strategically located where radio waves 421 may be detected from radio 418 (e.g., away from a station or home of an emergency responder). It is noted that in some embodiments, the functions of the detector 470 and the radio 420 may be combined into a single component, such as when using a software-defined radio (SDR) receiver. Detector 470 may be configured to generate radio incident data 412 based on the information provided with radio system 456. Radio incident data 412 may include audio data 416 and station ID 472. Audio data 416 may be a recording (in a digital format) of an emergency response request that was transmitted/dispatched using radio 418. Station ID 472 may be determined by detector 470 based on the station tone 419 transmitted by radio system 456/radio 418. In one embodiment, radio 420 and detector 470 are aspects of ERDS 402, according to an embodiment.

Emergency response application 406 enables field responders and operations center operators to receive emergency notification 430 of on-premises or onsite initiated emergency communications, according to an embodiment. Emergency notification 430 may include an address of an emergency, a graphical representation of the location of the emergency, an AI-based summary of the emergency, a transcript of the dispatch, a translation of the dispatch, and/or the nature of the emergency. Emergency notification 430 may include or be displayed with AI-based output 442, an estimated time of arrival (ETA) 437, and/or one or more sensor alerts 432. A user interface of the emergency response application may include one or more maps or floorplans, and the location of the dispatched emergency may be displayed on the maps and/or floorplans. Sensor alerts 432 is representative of one or more smart sensors associated with the managed premises, telematics data from nearby vehicles, medical data from people near the managed premises, weather data, traffic data, and/or other data sources that ERDS 402 may receive and aggregate to provide further context of an initiated emergency communication, according to an embodiment.

As noted above, the emergency response application 406, according to an embodiment, may be further designed to support geofence-triggered push notifications. When a field responder device enters a predefined geofenced area around an incident, the application may receive a signal from the alert module 110. In response, the application displays an emergency notification 430 that includes an AI-based summary of the incident (e.g., the AI-based output 442) generated by the AI module 440 within the insight generation module 108. This summary may provide critical information relevant to supporting responders, particularly those from mutual aid agencies, such as, but not limited to, incident severity, incident command location, shelter information, evacuation route details, other time-sensitive updates derived from the analyzed incident metadata and public records, etc.

Networks 426 may be communicatively coupled to various components of emergency notification environment 400 using a number of communications channels 476. For example, a communications channel 476A may communicatively couple ECC system 404 to the one or more networks 426. A communications channel 476B may communicatively couple electronic devices 458 to the one or more networks 426. A communications channel 476C may communicatively couple ERDS 402 to the one or more networks 426. A communications channel 476D may communicatively couple OCCS 408 to the one or more networks 426. A communications channel 476E may communicatively couple detector 470 to the one or more networks 426, for example. Communications channels 476A, 476B, 476C, 476D, and 476E may be collectively referred to as communications channels 476, which may enable the various components of emergency notification environment 400 to communicate with each other.

Figure 5:
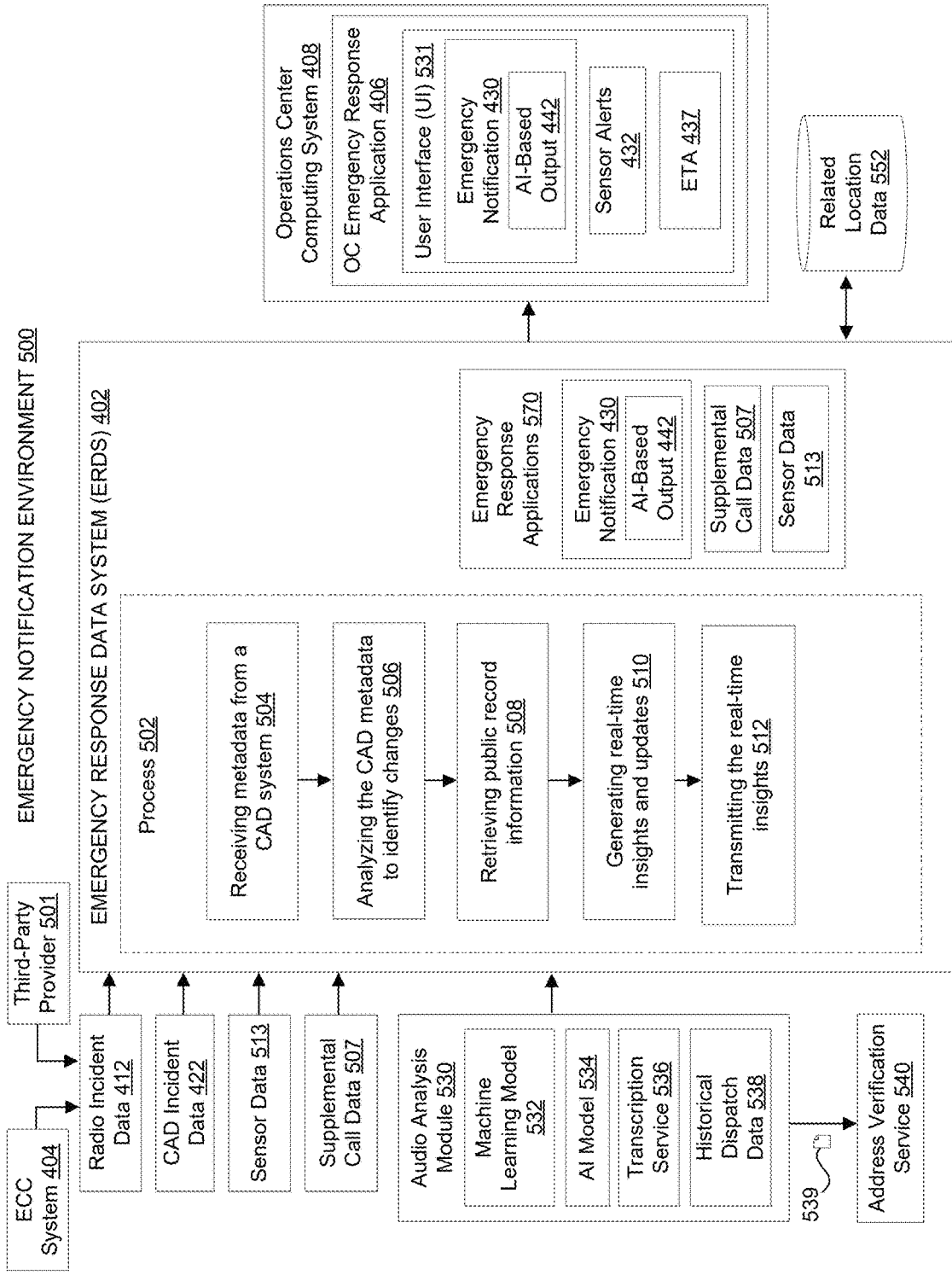
FIG. 5 illustrates an example diagram of an emergency notification environment that is operable to provide real-time intelligence and updates to emergency personnel, such as field responders and ECCs, using AI-based analysis of CAD system metadata and integration of public record information, in accordance with aspects of the disclosure.

FIG. 5 illustrates an example diagram of an emergency notification environment 500 that is operable to provide real-time intelligence and updates to emergency personnel, such as field responders and ECCs, using AI-based analysis of incident metadata (e.g., CAD metadata) and integration of public record information, in accordance with aspects of the disclosure. Emergency notification environment 500 is an example implementation of emergency notification environment 400, according to embodiments. Emergency notification environment 500 may run a process 502 in or with ERDS 402. ERDS 402 may be organized as one or more software modules including one or more processes, such as process 502 and/or other processes disclosed herein. Process 502 and/or ERDS 402 transform input data (e.g., radio incident data 412, CAD incident data 422, sensor data 513, and/or supplemental call data 507) into emergency notification 430 and/or AI-based output 442, in accordance with various aspects of the disclosure. For instance, ERDS 402 may receive an emergency response request represented by radio incident data 412, which includes audio data for a radio-based dispatch from an ECC about an initiated emergency communication. Radio incident data 412 may represent a radio-based dispatch from ECC system 404 about an initiated emergency communication (e.g., 911 call, textual message to 911), in one embodiment. Radio incident data 412 may be received from a third-party provider 501 that detects and records various radio-based dispatches across the country and/or world. ERDS 402 may process audio data from various radio-based dispatches to determine the nature of the emergency, to generate a summary of the dispatch, to determine a location of the initiated emergency communication, and/or to generate transcripts of the dispatches, in accordance with aspects of the disclosure. Radio incident data 412 may include incident data that was at least partially recorded with a detector that is coupled to a scanner to receive a radio-based dispatch from an ECC.

Process 502 may include a number of operations for generating AI-based output 442 for emergency notification 430 using Computer-Aided Dispatch (CAD) data, in accordance with aspects of the disclosure. The order in which some or all of the process operation blocks appear in process 502 should not be deemed limiting. Rather, one of ordinary skill in the art having the benefit of the present disclosure will understand that some of the process blocks may be executed in a variety of orders not illustrated, or even in parallel. The operations of process 502 may be performed by a particular system (e.g., AI-based real-time incident response intelligence system 100 of FIG. 1) or may be distributed between various subsystems or modules in ERDS 402 and/or in emergency notification environment 500, according to various embodiments. Furthermore, the operations of process 502 may be performed iteratively.

At operation 504, process 502 receives incident metadata from an emergency system (e.g., a Computer-Aided Dispatch (CAD) system), according to an embodiment. For instance, ERDS 402 may receive incident data 422 from a CAD system 424. This data may include location data, type of emergency, units dispatched, and comments. This incoming metadata stream encompasses key data points vital for effective emergency response. Firstly, the location of the incident is received, providing the necessary geographical context for dispatching appropriate resources. Secondly, the type of emergency is identified, categorizing the nature of the situation, such as medical emergency, fire, or police incident, thereby enabling the incident response intelligence system 100 to prioritize and allocate specialized units. The metadata also includes details about the specific emergency response units that have been dispatched to the scene, allowing for tracking and coordination of deployed personnel and vehicles. Furthermore, any relevant comments or notes entered by the CAD operator are also received, potentially offering additional context or specific instructions for responding units. Operation 504 may be performed by the monitoring module 102, and the process 502 may proceed to operation 506.

At operation 506, process 502 analyzes the incident metadata to identify changes in incident circumstances, including comparing current comments with historical comments corresponding to the location, according to an embodiment. This analysis is specifically focused on detecting alterations or modifications that signify changes in the circumstances surrounding an incident. A key aspect of this analysis involves a thorough comparison of the comments currently associated with the incident location against the historical record of comments that have pertained to the same location in previous incidents. This comparison allows the incident response intelligence system 100 to identify both new developments and recurring patterns in incident details. By examining the evolution of comments over time, the process aims to gain a deeper understanding of the incident context and potentially uncover crucial information that might not be immediately apparent from the current data alone. This historical comparison can reveal trends, pre-existing conditions, or recurring issues at a specific location, thereby enhancing the overall situational awareness and the effectiveness of the response. The identified changes in incident circumstances, gleaned from both the current and historical comments within the incident metadata, are then utilized in subsequent operations of the process 502 to inform decision-making and guide appropriate actions. Operation 506 may be performed by the analysis module 104, and the process 502 may proceed to operation 508.

At operation 508, process 502 accesses and retrieves public record information corresponding to the location, including property data, tax records, real estate records, historical records, and permits, according to an embodiment. This comprehensive data acquisition phase encompasses a variety of essential details, beginning with property data, which may include information such as property size, boundaries, zoning regulations, and structural characteristics. Furthermore, the incident response intelligence system 100 retrieves tax records associated with the location, providing insights into property valuation, tax assessments, and payment history. Real estate records are also accessed to gather information related to ownership history, past transactions, liens, and encumbrances. To provide a deeper understanding of the location's background, historical records, such as previous ownership details, significant events that occurred at the location, and historical land use information, are also collected. Finally, the process includes the retrieval of relevant permits that have been issued for the location, which could include building permits, environmental permits, and other authorizations that govern activities or structures at the property. The aggregation of this diverse set of public record information aims to create a comprehensive profile of the location, enabling subsequent processes to leverage this rich dataset for various analytical or operational purposes. Operation 508 may be performed by the data retrieval module 106, and the process 502 may proceed to operation 510.

At operation 510, process 502 generates real-time insights and updates regarding the incident, including reclassifying the type of emergency based on the analyzed metadata and retrieved public records, according to an embodiment. In other words, the incident response intelligence system 100 may generate real-time insights and updates to maintain situational awareness throughout the emergency response lifecycle. This includes dynamically reclassifying the nature of the emergency. This reclassification is achieved through continuous analysis of incoming metadata associated with the incident, such as location data, caller information, and initial reports. Simultaneously, the incident response intelligence system 100 retrieves and analyzes relevant public records, potentially including historical incident data, geographical information system (GIS) layers, and building schematics. By correlating the analyzed metadata with the information extracted from public records, the incident response intelligence system 100 can refine the initial classification of the emergency, providing more accurate information to first responders and relevant stakeholders. This dynamic reclassification ensures that the response strategy remains appropriate as new information becomes available, optimizing resource allocation and improving overall incident management effectiveness. Operation 510 may be performed by the insight generation module 108, and the process 502 may proceed to operation 512.

At operation 512, process 502 transmits the real-time insights to emergency personnel, including field responders and emergency communication centers (ECC), according to an embodiment. Accordingly, real-time insights and critical information gleaned from the preceding operations may be directly disseminated to relevant emergency personnel. This comprehensive data dissemination includes both field responders who are en route to or present at the scene of an emergency, and personnel staffing emergency communication centers (ECCs) responsible for coordinating the overall response. The transmitted real-time insights may encompass a wide range of data points, such as the precise location of the emergency, the nature and severity of the incident as it unfolds, environmental conditions that could impact safety or response efforts, and any other pertinent information that can enhance situational awareness and decision-making for those involved in managing the emergency. This immediate and accurate flow of information is crucial for enabling faster, more effective response strategies, ultimately contributing to improved outcomes in emergency situations. Operation 512 may be performed by the alert module 110.

According to additional embodiments, the exemplary systems and processes described herein may transcribe and/or translate the audio data using local place and agency names, according to an embodiment. One or more AI models and/or transcription/translation services may be used to directly analyze the audio data or to initially generate a transcript of the audio data and/or a translation of the audio data. One or more transcription engines or services that may or may not leverage an artificial intelligence (AI) model may be used to transcribe the audio, in accordance with various implementations of the disclosure. Similarly, several commercial translation services are available and may be utilized to provide accurate translation. For instance, transcription/translation services 536 may include commercially available solutions, such as Dragon NaturallySpeaking®, Otter.ai, Sonicx.ai, Descript, Verbit, and/or Google® services. Google Cloud Translation service, Google Cloud Natural Language service, Google Cloud Speech-to-Text service, etc. may enable training of sentiment classification, extraction, and detection by uploading training data, for example.

Emergency notification content may include, but is not limited to, a summary of the audio data, a transcript of the audio data, a nature/type of emergency dispatched, and/or an address/location of the initiated emergency communication that may cause the radio-based dispatch. Furthermore, the exemplary transcription process may generate potential address names from related location data (e.g., the bias region), according to an embodiment. The translation process may provide the bias region to a mapping service, such as OpenStreetMap, Apple Maps, etc., to retrieve the street names within and/or proximate to the bias region. The bias region may be provided to the mapping service using application programming interface (API) calls/functions, and the (list of) street names may be retrieved from the mapping service using API. These potential address/street names may be stored in a database such as related location data 552 and/or may be provided to an AI model to increase the likelihood of accurate location determination.

Furthermore, the address information may be validated. To validate the address from the emergency notification content, the content may be applied to an audio analysis module 530 and/or to an address verification service 540, according to an embodiment. Audio analysis module 530 may be used to determine or verify an address from transcribed audio data or from audio data. Audio analysis module 530 may include a machine learning model 532, an AI model 534, and/or a transcription/translation services 536—each of which may be trained on historical dispatch data 538 and/or on CAD incident data 422, according to an embodiment.

In one implementation, audio analysis module 530 iteratively identifies and proposes a potential address from the transcribed audio data at least partially on the related location data (e.g., street names from a mapping service). Audio analysis module 530 may search for key terms such as location, located at, at, and/or address. Audio analysis module 530 may then define 3-5 words that follow (or precede) the key term or that precede the key term to be a potential address or location. Although the term "address" is used to reference the location of an emergency, address may also include relative descriptors such as, "across the street from", "half a mile north of", "the south-west corner of", "behind the building located at", or the like. Audio analysis module 530 may provide the potential or proposed address 539 to address verification service 540. Of the one or more proposed addresses, audio analysis module 530 may select or return the verified or valid address as the address associated with the transcribed audio data, according to an embodiment.

Furthermore, the exemplary process 502 may provide an emergency notification to operations center emergency response application 406 to increase visibility at operations centers for emergencies occurring on premises or areas that the operations centers oversee, according to an embodiment. The emergency notification includes AI-based output 442 having one or more of a location of the emergency, a transcript of the radio-based dispatch, a translation of the radio-based dispatch, a summary of the radio-based dispatch, and/or a nature/type of emergency that are at least partially generated by providing prompts and data and context to one or more AI models. Emergency notification 430, sensor alerts 432, and/or ETA 437 may be displayed by a user interface (UI) 531 of emergency response application 406, according to an embodiment.

One or more of the operations of process 502 may use CAD incident data 422, sensor data 513, and/or supplemental call data 507 to train, supplement, and/or otherwise improve information provided in emergency notification 430, according to various embodiments of the disclosure. CAD incident data 422 may include text-based data for a dispatch that may be concurrently transmitted over-the-air as a radio-based dispatch. CAD incident data 422 may include a type of emergency, a location of the emergency, and a summary of the emergency. ERDS 402 may be configured to compare and contrast AI-generated output (e.g., a type of emergency, a location of the emergency, and a summary of the emergency) with CAD incident data 422 (e.g., a type of emergency, a location of the emergency, and a summary of the emergency) as accuracy feedback for improving the accuracy of the AI model, when CAD incident data 422 is available. Sensor data 513 may be retrieved or received by ERDS 402 an may include, but is not limited to, fire alarm data, smoke sensor data, temperature sensor data, proximity sensor data, moisture sensor data, pressure sensor data, shock sensor data, image sensor data, telematics data, door/window sensor data, and/or ambient conditions data, for example. Supplemental call data 507 may refer to hybrid device-based location data that may be received from telecommunications companies/device manufacturers. For example, a smartphone manufacturer may configure smartphones to temporarily turn on location-based sensors and provide the telephone number, a time stamp, and/or the device location to ERDS 402 when an emergency communication (e.g., call or text to 911) is initiated from the device, according to an embodiment.

ERDS 402 hosts emergency response applications 570 to support delivery of data and experiences to operations centers, ECCs, and/or field responders, in accordance with aspects of the disclosure. Emergency response applications 570 may support Internet-based connections between ERDS 402 and operations centers, ECCs, and/or first responders computing systems. ERDS 402 may provide emergency notification 430, AI-based output 442, and various types of data to emergency response applications 570, which are then pushed to local instances of the application (e.g., emergency response application 406), for example. It is noted that in some instances, the content of emergency notification 430 may be different when provided to the emergency response applications 570 as compared to the content provided to OCCS 408. For example, the OCCS 408 may be provided with a redacted or summarized version that removes personal information, etc.

Figure 6:
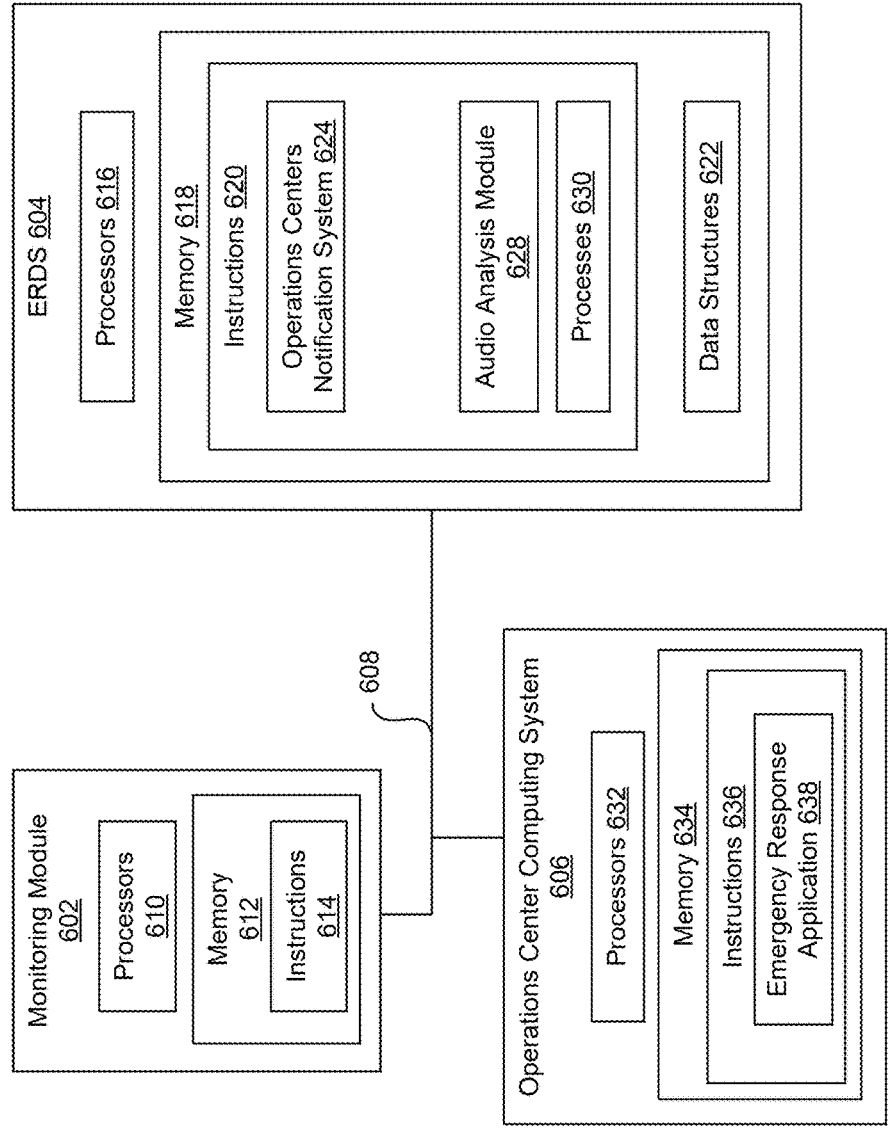
FIG. 6 illustrates an example diagram of an emergency response environment, in accordance with embodiments of the disclosure.

FIG. 6 illustrates an example diagram of an emergency response environment 600, in accordance with aspects of the disclosure. Emergency response environment 600 includes processing logic, (computer-readable) instructions, and data structures that may be employed by a detector 602, an emergency management system (ERDS) 604, and operations center computing system 606, according to an embodiment. Detector 602, ERDS 604, and operations center computing system 606 may be communicatively coupled to each other through one or more communication channels 608 (e.g., networks, wired or wireless networks, Internet, intranet, etc.), according to an embodiment.

Detector 602 is an example implementation of detector 470 (shown in FIG. 4), according to an embodiment. Detector 602 may include one or more processors 610 and memory 612. Memory 612 may include volatile and/or non-volatile memory. Memory 612 may store instructions 614 that may be executed by one or more processors 610, according to an embodiment.

ERDS 604 may include processors 616, memory 618, and data structures 622, according to an embodiment. Memory 618 may include instructions 620 and data structures 622, according to an embodiment. Memory 618 may include volatile and/or non-volatile memory. Instructions 620 may be stored by memory 618 and may include operations centers notification system 624, an audio analysis module 628, and one or more processes 630, according to embodiments of the disclosure. Data structures 622 may store one or more databases used within one or more of the disclosed emergency response environments and/or emergency response data systems, according to an embodiment.

Operations center computing system 606 includes processors 632 and memory 634, according to an embodiment. Memory 634 may include instructions 636, and instructions 636 may include an emergency response application 638. Emergency response application 638 is representative of emergency response application 406 (shown in FIG. 4), according to an embodiment.

Figure 7:
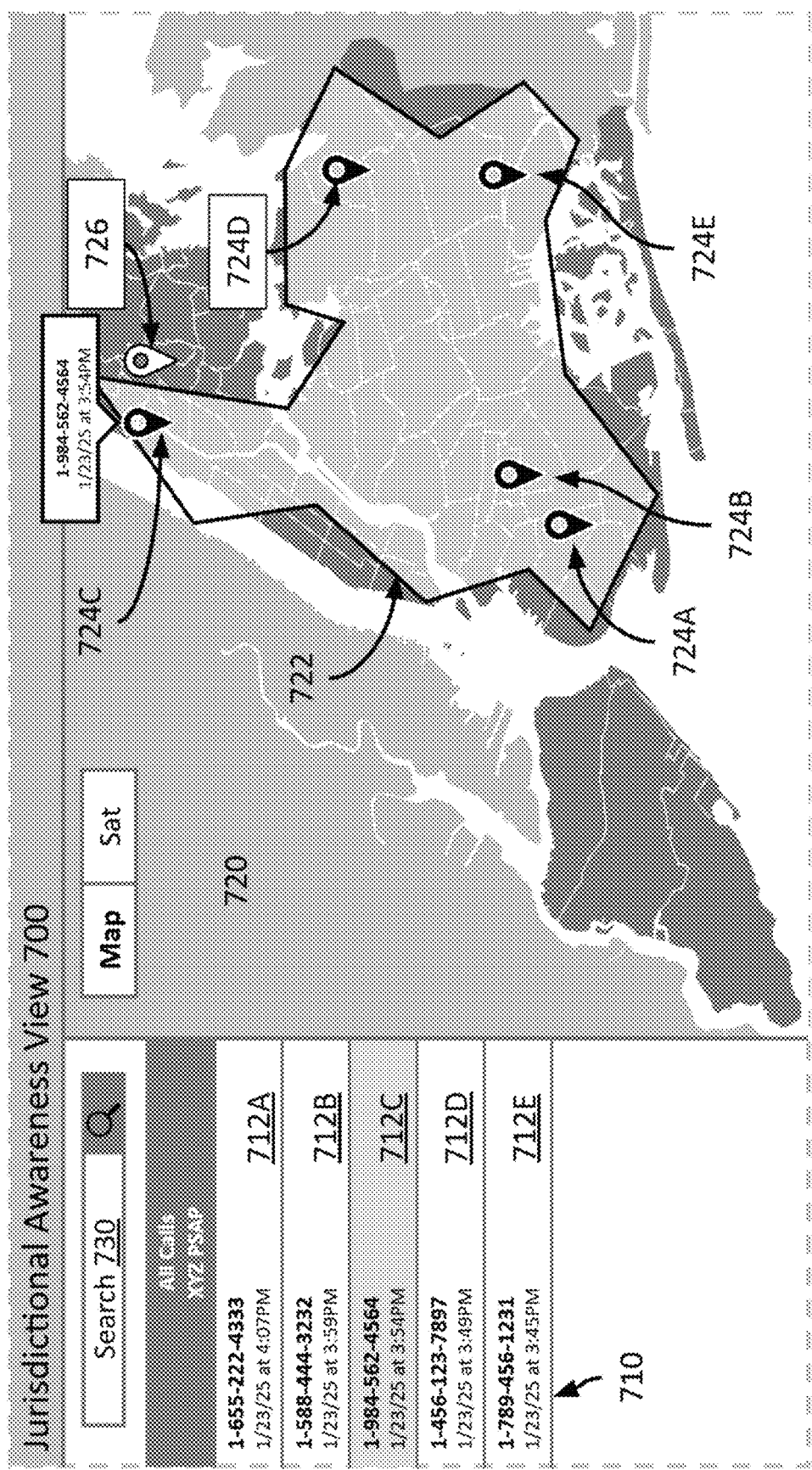
FIG. 7 illustrates an exemplary jurisdictional awareness view within an emergency response application, according to an embodiment.

As depicted in FIG. 7, an exemplary ERDS (such as ERDS 402 of FIG. 4) may use a jurisdictional awareness view 700 within an emergency response application (such as the emergency response application 406 of FIG. 4) to display emergency alerts and emergency data associated with emergency alerts to appropriate emergency services agencies as the emergency alerts are received by the ERDS in real-time. The system allows emergency personnel to see and be aware of all emergencies in their jurisdiction whether or not they are handling or responding to a particular emergency and whether or not an emergency call actually gets connected to the emergency services agencies. Additionally, even if emergency personnel are not immediately able to respond to an emergency alert, they are still able to see where the emergency is and when the emergency alert was received. As depicted by FIG. 7, in some embodiments, the jurisdictional awareness view 700 includes an incident queue 710 (also referred to as a "list of incidents") and an interactive map 720. In some embodiments, when an emergency alert or emergency data associated with the emergency alert is pushed to the emergency response application 406, an incident 712 is created for the emergency alert and displayed within the incident queue 710. In some embodiments, as depicted by FIG. 7, an incident 712 created for an emergency alert is displayed with a device identifier associated with the emergency alert. For example, FIG. 7 depicts five incidents 712 associated with five different emergency alerts, 712A-712E. Incident 712A is displayed with the device identifier "1-655-222-4333" representing the electronic device that generated the emergency alert that incident 712A was created for. It is understood that incidents within the incident queue 710 may be displayed or ordered in any manner for clarity and efficiency. In some embodiments, the incident queue 710 is ordered sequentially based on the time that the emergency alerts are received by the emergency response application 406. In some embodiments, the incident queue 710 is prioritized based on type of emergency, severity of the emergency or other appropriate factors. In some embodiments, the user is required to respond to emergency alerts in the alert queue sequentially. In some embodiments, the user may select or respond to any emergency alert in the queue in any order.

In some embodiments, the incident queue 710 includes a search box 730 that allows the user to quickly find device incidents within the incident queue 710 by their associated device identifiers. In some embodiments, the search box 730 allows for searching in a current incident queue. In some embodiments, the search box 730 allows for searching through historical incidents. In some embodiments, the search box 730 allows for searching in a current incident queue and historical incidents. In some embodiments, a historical incident is an incident terminated or resolved anytime in the previous 5 mins, 30 mins, 60 mins, 3 hours, 6 hours, 12 hours, or 24 hours. In some embodiments, a historical incident is an incident terminated or resolved at a previous time. In this respect, a user is able to review the history of a device identifier with respect to previous emergency alerts (e.g., emergency calls). For example, a search for the device identifier "1-655-222-4333" may return incident 712A, a current incident that is currently displayed within the incident queue 710, as well as one or more historical incidents associated with previous emergency alerts associated with the device identifier.

As mentioned above, in some embodiments, the jurisdictional awareness view 700 includes an interactive map 720. In some embodiments, the jurisdictional awareness view 700 displays one or more geofences 722 associated with the ERDS 402 for which the emergency response application 406 has been accessed. In some embodiments, the jurisdictional awareness view 700 displays one or more incident locations (e.g., a location marker) for each incident listed in the incident queue 710 within the interactive map 720. For example, FIG. 7 depicts five incident locations within the interactive map 720, incident location markers 724A-724E, one for each of the five incidents listed in the incident queue 710, incidents 712A-712E, respectively. In some embodiments, the jurisdictional awareness view 700 displays at least one incident location for each incident listed in the incident queue 710.

Furthermore, in some embodiments the jurisdictional awareness view 700 may display one or more emergency responder locations (e.g., a responder location marker 726) corresponding to one or more emergency services personnel within the interactive map 720. As detailed above, the exemplary emergency response application 406 may be designed to support geofence-triggered push notifications. When a field responder device enters a predefined geofenced area (e.g., geofences 722) around an incident, the application receives a signal from the alert module 110. For instance, the responder location marker 726 is depicted as just outside of the geofence 722 displayed in the jurisdictional awareness view 700. Furthermore, the responder location marker 726 is in close proximity to incident location 724A. In response to the responder location marker 726 entering the area within the geofence 722, the emergency responder may receive one or more summaries of the incidents within the geofence 722, including incident 712C. In other words, the emergency response application 406 may display an emergency notification 430 that includes an AI-based summary of the incident (AI-based output 442) generated by the AI module 440 within the insight generation module 108. This summary may provide critical information relevant to supporting responders, particularly those from mutual aid agencies, such as incident severity, incident command location, shelter information, evacuation route details, and other time-sensitive updates derived from the analyzed incident metadata and public records.

In some embodiments, each location and location marker (incident, responder, etc.) are automatically updated or changed. In some embodiments, the location is updated or changed to reflect a response status of secondary response agencies, such as the fire department or police department. In some embodiments, the location is updated or changed to reflect response status at a PSAP. For example, the incident location may be flashing to indicate that no user at the PSAP has attended to the associated incident. In another example, the incident location may automatically change a color of an incident location to indicate that a first responder has been dispatched to the associated emergency location. In another example, an incident location may automatically change to reflect that an emergency is no longer active, or the caller has exited the jurisdictional geofence 722 of the PSAP. Similarly, the responder location marker 726 may flash or change color to indicate a change in status (e.g., responding, active, inactive, moving, providing services, etc.).

In some embodiments, the user is enabled to toggle on and off location customization preferences. In some embodiments, the user is enabled to display device identifier data (e.g. phone numbers) adjacent to an incident location or a responder location. For example, as depicted in FIG. 7, an additional data overlay associated with incident 712C (e.g., the associated device identifier and the time and date that the associated emergency alert was received) is displayed directly above the incident location 724C associated with incident 712C. In some embodiments, data associated with an incident is displayed within the interactive map 720 in response to the incident or associated incident location being selected within the incident queue 710 or interactive map 720. In some embodiments, a user may select an incident or an incident location by clicking on or hovering over the incident or incident location.

In some embodiments, the user initiates the emergency response application 406 to find the jurisdictional awareness view 700, which displays one or more geofences associated with the ERDS 402 within an interactive map 720. In some embodiments, the jurisdictional awareness view 700 is populated with previous and current incidents associated with emergency alerts being attended to by the ESP. In some embodiments, upon initiation of the emergency response application 406, the jurisdictional awareness view 700 is not populated with previous and current incidents, but becomes populated with each incoming emergency alert following the initiation of the emergency response application 406. In some embodiments, as mentioned above, when an incident is added to the incident queue 710, a corresponding incident location is added to the interactive map 720. In some embodiments, when an incident is removed from the incident queue 710 (e.g., if the incident is resolved, marked as a duplicate, or otherwise deleted), the corresponding incident location is removed from the interactive map 720. In some embodiments, wherein the user hovers or selects the incident location, the device identifier (e.g., phone number) associated with the corresponding incident is displayed adjacent to the incident location. FIG. 7 illustrates the selection of an incident 712C in the incident queue 710, which is then displayed at the corresponding incident location 724C. In some embodiments, multiple incidents 712 may be selected in the incident queue 710 to display information adjacent to the corresponding incident location 724.

In some embodiments, wherein a device that generated an emergency alert for which an incident is created within the jurisdictional awareness view 700 is a mobile device and is relocating in real time, the device's location is updated within the interactive map of the jurisdictional awareness view 700 in real time. For example, when the emergency alert (including an initial location) is generated and transmitted to (or detected by) the emergency services agencies or emergency management system (EMS) which may determine an appropriate ERDS 402 to receive the emergency alert and any data associated with the emergency alert and then automatically push the emergency alert and any data associated with the emergency alert to the ERDS 402 through the jurisdictional awareness view 700 of the emergency response application 406. The emergency response application 406 may then create an incident associated with the emergency alert within the jurisdictional awareness view 700, such as by listing an incident in the incident queue 710 and displaying a corresponding incident location within the interactive map 720. For instance, if the device sends an updated location to the EMS, the EMS may automatically push the updated location to the emergency response application 406. The emergency response application 406 may then update the incident location by moving the incident location within the interactive map 720 to the location of the updated location received from the device. In some embodiments, the emergency response application 406 displays the location associated with all incidents listed in the incident queue 710 and tracks the location associated with each incident in real time simultaneously using the incident location markers, such as markers 724A-724E. Likewise, the emergency response application 406 displays the location associated with one or more emergency responders and tracks the location associated with one or more emergency services personnel in real time simultaneously using the responder location marker, such as marker 726.

Figure 8:
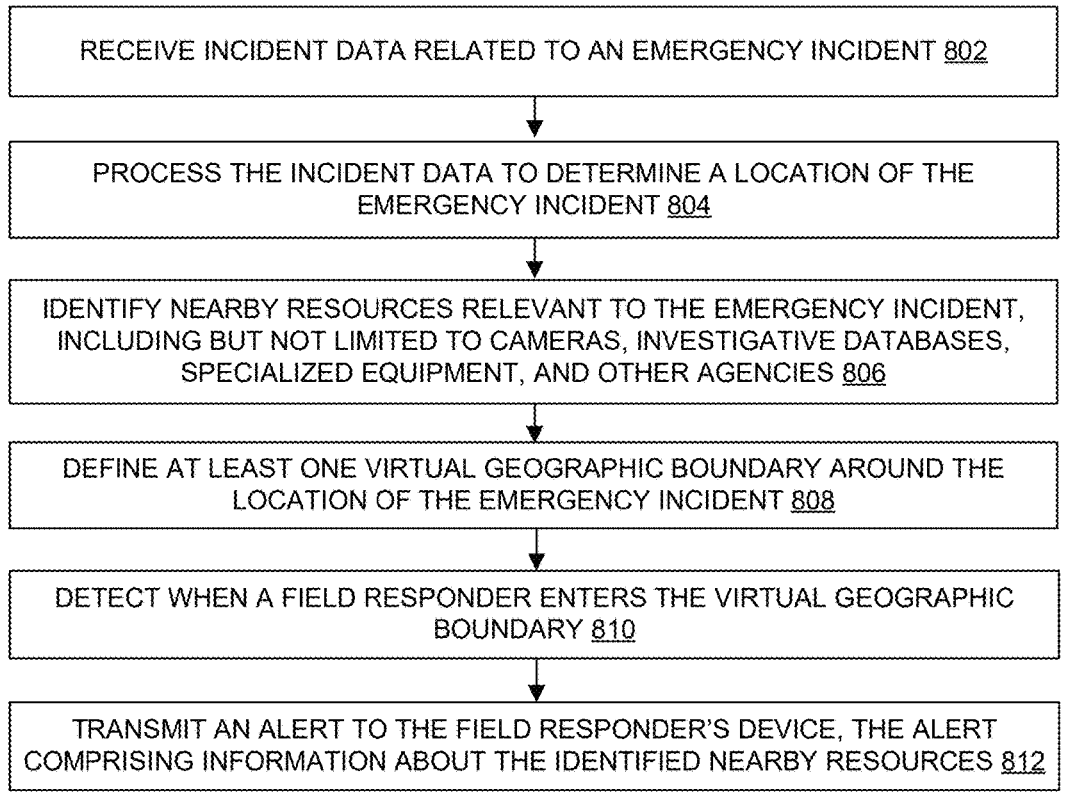
FIG. 8 illustrates an exemplary flow diagram of a process for enhancing incident response by providing real-time resource awareness to field responders and incorporating geofencing, in accordance with embodiments of the disclosure.

FIG. 8 illustrates an exemplary flow diagram of a process 800 for enhancing incident response by providing real-time resource awareness to field responders and incorporating geofencing, in accordance with embodiments of the disclosure. The order in which some or all of the process operation blocks appear in process 800 should not be deemed limiting. Rather, one of ordinary skill in the art having the benefit of the present disclosure will understand that some of the process blocks may be executed in a variety of orders not illustrated, or even in parallel. The operations of process 800 may be performed by a particular system (e.g., incident response intelligence system 100 of FIG. 1) or may be distributed between various subsystems or modules in an ERDS, according to various embodiments. The operation of process 800 may be performed iteratively.

At operation 802 within process 800, a monitoring module (e.g., the monitoring module 102 depicted in FIG. 1) may be configured to receive incident data related to an emergency incident. The monitoring module's capability to receive incident data can be realized through various interfaces and protocols. For instance, in one implementation, operation 802 might involve the monitoring module establishing a secure connection with a CAD system via an API to pull incident data in real-time. In another variation, the monitoring module could listen for radio-based dispatches via a radio receiver and decode the audio data to extract incident details, as mentioned in earlier sections. Furthermore, the incident data received in operation 802 may include a variety of formats, ranging from structured data like timestamps and location coordinates to unstructured data such as free-text descriptions of the emergency. The flexibility in how the monitoring module receives and processes incident data is crucial for ensuring adaptability across different emergency response systems and scenarios.

At operation 804, an analysis module (e.g., the analysis module 104 depicted in FIG. 1) may be configured to process the incident data to determine a location of the emergency incident. The analysis module may utilize various techniques to process the incident data to determine this location. For instance, if the incident data contains GPS coordinates, operation 804 might involve extracting and validating these coordinates to ensure they fall within acceptable ranges and refer to a real-world location. If the incident data contains a street address, the analysis module could use a geocoding service via an API to convert the address into latitude and longitude coordinates. In cases where the incident data includes a descriptive location (e.g., "near the corner of Main and Elm"), the analysis module may employ NLP techniques to parse the description and match it against a database of locations or a mapping service to infer the geographic coordinates. The accuracy and method used in operation 804 are crucial as the determined location serves as a foundation for subsequent operations, such as identifying nearby resources and establishing geofences.

At operation 806, a data retrieval module (e.g., the data retrieval module 106 depicted in FIG. 1) may be configured to identify nearby resources relevant to the emergency incident, including but not limited to cameras, investigative databases, specialized equipment, and other agencies. This identification process involves querying various data sources based on the determined location from operation 804. For instance, the data retrieval module could access a database of public safety cameras within a certain radius of the incident, using APIs or direct database connections. Similarly, it may access investigative databases such as criminal records, building permits, or hazardous materials databases, using search algorithms or predefined queries to find relevant information linked to the location. Specialized equipment could range from thermal imaging devices available at nearby fire stations to drones or other surveillance tools, and the module might connect to inventory management systems of local agencies to ascertain availability. Furthermore, "other agencies" may include nearby police departments, medical facilities, utility companies, or even private organizations with relevant resources, and the module could use agency directories or communication platforms to identify and contact these entities. The data retrieval module must prioritize and filter this information to ensure it is relevant and actionable for field responders, taking into account the specific type of emergency and the resources likely needed.

At operation 808, a geofencing module (e.g., the geofencing module 128 depicted in FIG. 1) may be configured to define at least one virtual geographic boundary around the location of the emergency incident. Furthermore, operation 808, which involves a geofencing module being configured to define at least one virtual geographic boundary around the location of the emergency incident, may utilize the memory components described within the disclosure. The memory, whether volatile like RAM or non-volatile such as flash memory or disk storage, plays a crucial role in storing the geographic coordinates that define these virtual boundaries. These coordinates, often represented as latitude and longitude values or polygon vertices, are stored as data structures within the memory. Additionally, the geofencing module's operational logic, including algorithms for determining if a field responder has entered or exited the defined boundary, is also stored as computer-readable instructions within the memory. When the geofencing module is activated, the processor retrieves these instructions and data structures from the memory to execute the geofencing functionality. The persistence of these defined geofences across system reboots or power cycles is ensured by utilizing non-volatile memory, which retains data even when the system is turned off. Therefore, the memory component, with its various architectures and technologies, is integral to the reliable and accurate implementation of operation 808, ensuring that the virtual geographic boundaries remain stable and accessible throughout the incident response.

At operation 810, an alert module (e.g., the alert module 110 depicted in FIG. 1) may be configured to detect when a field responder enters the virtual geographic boundary. Accordingly, at operation 810, one of the functions of the alert module is to continuously monitor the location of field responders in relation to the virtual geographic boundaries defined in operation 808. This monitoring can be achieved through various location tracking technologies, such as GPS data from the field responder's mobile devices or vehicles.

The alert module may periodically receive location updates from these devices and calculate their positions in real time. To determine if a field responder has entered the virtual geographic boundary, the alert module utilizes geospatial algorithms and boundary checking techniques. It compares the field responder's current coordinates with the coordinates defining the geofence. If the responder's location falls within the polygon or circle defined by the geofence, or if the distance between the responder and the geofence boundary is below a certain threshold, the alert module registers an "entry" event. This detection mechanism must be highly responsive and accurate to ensure that the field responder receives timely alerts upon entering the geofenced area. Furthermore, operation 810 may include error handling and robustness measures to address potential issues such as GPS inaccuracies, network latency, or device connectivity problems. These measures might involve filtering erroneous location data, buffering location updates, and implementing failover mechanisms to ensure reliable geofence entry detection.

At operation 812, which may occur in response to the detection of a field responder entering the virtual geographic boundary in operation 810, the alert module may transmit an alert to the field responder's device. This alert is not merely a generic notification but is specifically tailored to provide valuable, actionable information. According to various embodiments detailed within the disclosure, the alert is designed to comprise information about the nearby resources identified in operation 806. This information may include the location and availability of public safety cameras, details from investigative databases relevant to the incident location, the presence of specialized equipment at nearby stations, or contact information and capabilities of other responding agencies. For instance, the alert might list the addresses and live feeds of the two closest traffic cameras, a summary of prior incident reports from a criminal history database for the address, and the availability of a hazmat team from a neighboring fire department. The intent behind providing this information is to directly enhance the field responder's ability to effectively address the emergency incident. By being immediately informed of these resources, the responder can make quicker and more informed decisions, potentially saving time and resources. This could mean utilizing camera feeds to assess the situation before arrival, coordinating with specialized teams more efficiently, or being aware of potential hazards based on database information. The alert might be delivered through the emergency response application 406 on the responder's device, ensuring a clear, immediate, and organized presentation of this critical information.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded with the widest scope consistent with this disclosure, the principles and the novel features disclosed herein.

The term "logic" and/or "processing logic" in this disclosure may include one or more processors, microprocessors, multi-core processors, application-specific integrated circuits (ASIC), and/or field programmable gate arrays (FPGAs) to execute operations disclosed herein. In some embodiments, memory may be integrated into the logic to store instructions to execute operations and/or store data. Logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application-specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable or non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system for providing real-time intelligence during a response to an incident, comprising:
    a monitoring module configured to receive and process incident metadata from an emergency system, wherein the incident metadata includes current comments and at least one of a location, a type of emergency, and a description of units dispatched;
    an analysis module configured to analyze the incident metadata and identify changes in incident circumstances, including comparing the current comments with historical comments corresponding to the location;
    a data retrieval module configured to access and retrieve public record information corresponding to the location;
    an insight generation module configured to generate real-time insights and updates regarding the incident, including reclassifying the type of emergency based on the analyzed incident metadata and retrieved public records; and
    an alert module configured to transmit the real-time insights to emergency personnel.

2. The system of claim 1, wherein the analysis module includes a natural language processing (NLP) component to analyze textual comments within the incident metadata from the emergency system.

3. The system of claim 1, wherein the incident metadata from an emergency system has been processed by one of a transcription service and a language translation service.

4. The system of claim 1, wherein the public record information includes at least one of property data, tax records, real estate records, historical records, and permits.

5. The system of claim 1, wherein the data retrieval module further comprises a municipality search engine to provide additional information on the location.

6. The system of claim 1, wherein the insight generation module further comprises an incident summary generator to update and reclassify the type of emergency based on the analyzed incident metadata and retrieved public records.

7. The system of claim 1, wherein the alert module is configured to transmit digital alerts to field responder including at least one of Hazmat summaries, handling instructions, nearby cameras and other investigative resources.

8. A method for providing real-time intelligence during a response to an incident, comprising:
    receiving incident metadata from an emergency system, wherein the incident metadata includes current comments and at least one of a location, a type of emergency, and a description of units dispatched;
    analyzing the incident metadata to identify changes in incident circumstances, including comparing the current comments with historical comments corresponding to the location;
    accessing and retrieving public record information corresponding to the location;
    generating real-time insights and updates regarding the incident, including reclassifying the type of emergency based on the analyzed incident metadata and retrieved public records; and
    transmitting the real-time insights to emergency personnel.

9. The method of claim 8, wherein analyzing the incident metadata includes using a natural language processing (NLP) component to analyze textual comments within the incident metadata from the emergency system.

10. The method of claim 8, wherein the incident metadata from an emergency system has been processed by one of a transcription service and a language translation service.

11. The method of claim 8, wherein the public record information includes at least one of property data, tax records, real estate records, historical records, and permits.

12. The method of claim 8, wherein accessing and retrieving public record information further comprises using a municipality search engine.

13. The method of claim 8, wherein generating real-time insights further comprises updating and reclassifying the type of emergency using an incident summary generator.

14. The method of claim 8, wherein transmitting the real-time insights includes transmitting digital alerts to field responder including at least one of Hazmat summaries, handling instructions, nearby cameras and other investigative resources.

15. A non-transitory computer-readable medium storing instructions that, when executed by a processor, cause the processor to perform a method for providing real-time intelligence during a response to an incident, the method comprising:
    receiving incident metadata from an emergency system, wherein the incident metadata includes current comments and at least one of a location, a type of emergency, and a description of units dispatched;
    analyzing the incident metadata to identify changes in incident circumstances, including comparing the current comments with historical comments corresponding to the location;
    accessing and retrieving public record information corresponding to the location;
    generating real-time insights and updates regarding the incident, including reclassifying the type of emergency based on the analyzed incident metadata and retrieved public records; and
    transmitting the real-time insights to emergency personnel.

16. The non-transitory computer-readable medium of claim 15, wherein the analysis module includes a natural language processing (NLP) component to analyze textual comments within the incident metadata from the emergency system.

17. The non-transitory computer-readable medium of claim 15, wherein the incident metadata from an emergency system has been processed by one of a transcription service and a language translation service.

18. The non-transitory computer-readable medium of claim 15, wherein the public record information includes at least one of property data, tax records, real estate records, historical records, and permits.

19. The non-transitory computer-readable medium of claim 15, wherein accessing and retrieving public record information further comprises using a municipality search engine.

20. The non-transitory computer-readable medium of claim 15, wherein generating real-time insights further comprises updating and reclassifying the type of emergency using an incident summary generator.

* * * * *